(12) United States Patent
Bechtel, Jr. et al.

(10) Patent No.: US 7,402,109 B2
(45) Date of Patent: Jul. 22, 2008

(54) RADIUS GIMLET POINT ANTI-STRIPOUT SCREW

(75) Inventors: Frank W. Bechtel, Jr., Roscoe, IL (US); Timothy L. Day, Harvard, IL (US); Joseph F. Downey, St. Charles, IL (US); Michael P. Glynn, Lamont, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/716,427

(22) Filed: Mar. 9, 2007

(65) Prior Publication Data
US 2007/0178979 A1    Aug. 2, 2007

Related U.S. Application Data

(63) Continuation of application No. 10/397,066, filed on Mar. 25, 2003, now abandoned.

(60) Provisional application No. 60/367,552, filed on Mar. 26, 2002.

(51) Int. Cl.
*B21H 3/02*    (2006.01)

(52) U.S. Cl. .............................................. 470/10; 470/8
(58) Field of Classification Search .................... 72/88, 72/90, 469; 470/8, 9, 10, 65, 66, 68, 185
See application file for complete search history.

(56) References Cited

U.S. PATENT DOCUMENTS

| 3,176,491 | A | * | 4/1965 | Mau et al. ..................... 72/71 |
| 3,789,643 | A | * | 2/1974 | Dickson ....................... 72/469 |
| 4,301,563 | A | * | 11/1981 | Deveney, Jr. ................. 470/10 |
| 6,508,820 | B2 | * | 1/2003 | Bales .......................... 606/73 |
| 6,712,708 | B2 | * | 3/2004 | Boyer et al. .................. 470/9 |
| 7,040,850 | B2 | * | 5/2006 | Gaudron ..................... 411/412 |

* cited by examiner

*Primary Examiner*—Edward Tolan
(74) *Attorney, Agent, or Firm*—Mark W. Croll; Paul F. Donovan

(57) ABSTRACT

A self-tapping screw includes a head, a shaft, a tapered end and a rounded distal tip. A thread includes a thread start on the tapered end. The axial position of the thread start and a first full thread, the radius of the round distal tip and the diameter of the tapered end at the thread start are controlled in relation to the screw size for consistent, improved screw performance.

4 Claims, 1 Drawing Sheet

RADIUS GIMLET POINT ANTI-STRIPOUT SCREW

CROSS-REFERENCE TO RELATED APPLICATION

This present application is a continuation of U.S. patent application Ser. No. 10/397,066 filed on Mar. 25, 2003; now abandoned which claimed benefit to U.S. Provisional Application No. 60/367,552, filed on Mar. 26, 2002.

FIELD OF THE INVENTION

The present invention generally relates to threaded fasteners, and more particularly, the invention relates to thread-forming or self-tapping screws.

BACKGROUND OF THE INVENTION

Thread-forming, self-tapping screws are known in the art for a variety of uses and applications. Unlike a standard screw that forms the male component which accepts a nut, or other female component of a threaded fastener system, a thread forming screw is driven into a body, forming threads therein as the screw advances. Depending on the size of the screw, the composition of the body in which it is driven and other factors, a pilot hole may be provided in the body before the screw is inserted.

One form of thread-forming screw, commonly referred to as a sheet metal screw, is provided for fastening together two relatively thin panels of material. Sheet metal screws have many applications and uses, including assembling panels and components of appliances, securing sections of ductwork, securing small parts of assemblies of various types, and the like. Some difficulties encountered in using sheet metal screws include providing sufficient holding force (resistance to stripout) with a lower driving force in relatively thin, sheet-like materials. Since the panels held together frequently are thin, a screw that is inserted through the panels often will protrude beyond the furthest surface from the first surface through which the screw is inserted. Screw ends protruding in this manner can damage materials and things coming in contact therewith, such as wires in appliances. The sharp, protruding points of known sheet metal screws can be a source of personal injury in the way of scratches and puncture wounds to persons coming in contact therewith.

Problems encountered in the design of sheet metal screws increase as the materials for which the screws are used become thinner, from efforts to reduce weight and decrease costs in the final assemblies, such as appliances. Thus, it is known to provide sheet metal screws of one type or design for use in very thin materials and of a different type or design for use in somewhat thicker materials. Even so, strip-out remains a problem in thinner materials. It also is known that one screw will insert readily and quickly while a next similar screw used in the same material will not "start" readily, but instead will dwell in the pilot hole with the threads riding on the surface of the material without advancing into the material. It is cumbersome and disadvantageous to have to obtain, store and use a variety of different sheet metal screws, depending upon the thickness of the material in which it is used. A single screw design useful in both thin and thick materials provides advantages to both the manufacturer and the user of the screw. Particularly on assembly lines, it is desirable that attachment sequences be performed consistently, and that all similar sheet metal screws inserted into similar materials react in the same way in starting, driving and seating in the material.

It has been a long-accepted standard of the fastener art to provide sheet metal screws in standard sizes based on thickness. Numerical designations have been used for the different sizes, with the larger number being a thicker screw. Thus, by way of example, a #10 screw is thicker than a #8 screw, which is thicker than a #6 screw, which is thicker than a #4 screw. It is also well known and universally accepted among screw manufacturers and users that different screw sizes are provided with different numbers of threads per inch of screw length. Again by way of example, it is commonly known and understood that a #4 screw has 24 threads per inch of shaft length, a #8 screw has 18 threads per inch and a #10 screw has 16 threads per inch. This increases the complexity of manufacturing facilities and equipment needed to manufacture sheet metal screws in a variety of different sizes.

What is needed in the art is a standardized thread-forming tapping screw that overcomes some or all of the aforementioned disadvantages of known thread-forming tapping screws.

SUMMARY OF THE INVENTION

The present invention provides a thread-forming tapping screw useful in both thick and thin materials that has controlled thread start locations, common thread pitch among different size screws and a rounded screw tip.

In one aspect thereof, the present invention provides a thread-forming tapping screw with a head and a shaft extending from the head, the shaft having a mean minor diameter. A helical thread on the shaft has a mean major diameter. A tapered end on the shaft has a distal tip. A thread start of the helical thread is disposed at a position on the tapered end an axial distance from the distal tip related by a thread start factor to the mean minor diameter of the screw, the thread start factor being between about 0.4 and about 0.5.

In another aspect thereof, the present invention provides a thread-forming tapping screw with a head and a shaft extending from the head, the shaft having a mean minor diameter. A helical thread on- the shaft has a mean major diameter. A tapered end on the shaft has a distal tip. A thread start of the helical thread is disposed on the tapered end, the tapered end having a diameter at the thread start related by a diameter factor to the mean minor diameter of the screw, the diameter factor being between about 0.6 and about 0.7.

In still another aspect thereof, the present invention provides a thread-forming tapping screw with a head and a shaft extending from the head, the shaft having a mean minor diameter. A helical thread on the shaft has a mean major diameter. A tapered end on the shaft has a distal tip. A thread start of the helical thread is disposed on the tapered end, the distal tip having a rounded shape formed on a radius related by a radius factor to the mean minor diameter of the screw, the radius factor being between about 0.2 and about 0.3.

In a further aspect thereof, the present invention provides a thread-forming tapping screw with a head and a shaft extending from the head, the shaft having a mean minor diameter. A helical thread on the shaft has a mean major diameter. A tapered end on the shaft has a distal tip. A thread start of the helical thread is disposed on the tapered end, the thread having a first full thread on the shaft an axial distance from the distal tip related by a distance factor to the mean minor diameter, the distance factor being between about 1.02 and about 1.08.

In a still further aspect thereof, the present invention provides a method for making a thread-forming tapping screw having a head, a shaft extending from the head and a helical thread on the shaft. The method includes steps of determining a screw size and a mean minor diameter for the screw as the average of minimum and maximum acceptable shaft diameters for the screw size. The method further includes forming the screw head, the shaft extending from the head and a tapered end on the shaft having a distal tip; and forming the helical thread on the shaft including a thread start on the tapered end and a first full thread following the thread start. The forming steps including at least one of creating the thread start at a position on the tapered end an axial distance from the distal tip related to the mean minor diameter by a thread start factor of between about 0.4 and about 0.5; creating the first full thread on the shaft an axial distance from the distal tip related to the mean minor diameter by a distance factor of between about 1.02 and about 1.08; creating the tapered end with a diameter at the thread start related to the mean minor diameter by a diameter factor of between about 0.6 and about 0.7; and creating the distal tip with a rounded shape formed on a radius related to the mean minor diameter by a radius factor of between about 0.2 and about 0.3.

An advantage of the present invention is providing a sheet metal screw that is easy to use and that performs consistently from screw to screw in both insertion and retention.

Another advantage of the present invention is providing a sheet metal screw that can be used advantageously for fastening into both thicker and thinner materials.

Still another advantage of the present invention is providing a sheet metal screw that has a common number of threads per inch of screw length for various screw sizes.

A further advantage of the present invention is providing a sheet metal screw that starts consistently from one screw to the next when used in similar materials.

A still further advantage of the present invention is providing a sheet metal screw that minimizes the risk of damage to things and injury to people coming in contact with the tip of the screw.

Other features and advantages of the invention will become apparent to those skilled in the art upon review of the following detailed description, claims and drawings, in which like numerals are used to designate like features.

Figure 1:
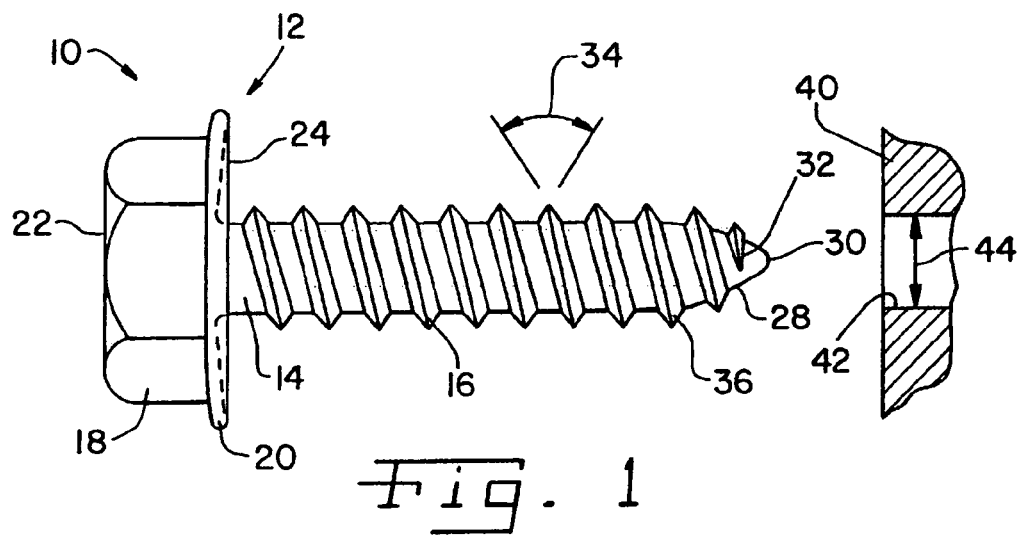
FIG. 1 is an elevational view of a thread-forming screw in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting.

DETAILED DESCRIPTION OF THE PREFERRED EMBODIMENT

Referring now more specifically to the drawings and to FIG. 1 in particular, a sheet metal screw 10 in accordance with the present invention is shown. Sheet metal screw 10 is of particular advantage when used for fastening together thin, sheet-like materials or panels, or for fastening objects and things to thin sheet materials.

Sheet metal screw 10 has a head 12 and a shank or shaft 14. A continuous thread 16 is provided on shaft 14, extending substantially the full length of shaft 14. Sheet metal screw 10 is a monolithic body, including head 12, shaft 14 and thread 16, that may be formed by various common and well known screw forming processes, including but not limited to stamping, rolling, casting and machining. Sheet metal screw 10 can be made from various materials, including but not limited to metals or plastics, the selection of which will depend upon the ultimate use for screw 10 and the materials of a body 40 or panels (not shown) in which screw 10 will be used. Screw 10 is fastened in an appropriately sized pilot hole 42 provided in body 40, pilot hole 42 having a diameter indicated by arrowed line 44 selected for the size of screw 10.

Head 12 includes a cap 18 and a flange 20. Cap 18 can be of various shapes and configurations for engagement with a driver used to insert screw 10 into the body or panels (not shown). Cap 18 can be designed for engagement by both power tools and manual tools. Thus, for example, cap 18 can be of hexagonal or other perimeter shape as shown, for engagement with a socket or other wrench type driver operating on the perimeter surface of cap 18. Further, cap 18 can be provided with a slot or slots (not shown), or other shaped opening (not shown) formed inwardly from an outer surface 22 of cap 18, to receive the blade of a screwdriver, hex key or other tool inserted into cap 18.

Flange 20 extends laterally from the juncture between cap 18 and shaft 14, and is of particular advantage when cap 18 is formed for engagement by wrench type tools operating on the perimeter surfaces thereof. Flange 20 forms a body against which a face of the tool can rest, for proper driving engagement between the tool and head 12. A thread-facing surface 24 of flange 20 can be provided with slots or ribs 26 or other surface treatment to achieve a desired surface-to-surface relationship between flange 20 and the body or panels (not shown) in which screw 10 is inserted. In some applications of and uses for screw 10, flange 20 is not required.

Without consideration of thread 16 integrally formed on the outer surface thereof, shaft 14 is a substantially cylindrically shaped body extending from head 12. Shaft 14 is of substantially consistent diameter throughout its length, except for a tapered end 28 forming a rounded distal tip 30.

Thread 16 extends helically around and along shaft 14, having a thread start 32 on tapered distal tip 30, and terminating near head 12. Thread 16 spirals from thread start 32 at a consistent thread pitch through out the length thereof, forming preferably 18 threads per axial inch of shaft 14 for all screws 10, regardless of the size of screw 10. Thus, in contrast to known sheet metal screw designs, in which screws of different widths are provided with different thread pitch, in accordance with a preferred embodiment of the present invention, thinner and thicker screws are all provided with 18 threads per axial inch of shaft 14, and manufacture is thereby simplified.

A thread angle, designated by numeral 34 in FIG. 1, is standardized at about fifty-eight degrees for all screw sizes in accordance with a preferred embodiment of the present invention.

Thread start 32 is located on tapered end 28 in a precise location relative to distal tip 30, as will be described in further detail hereinafter. Thread start 32 tapers outwardly from the surface of shaft 14, leading into a first full thread 36 on shaft 14.

Figure 2:
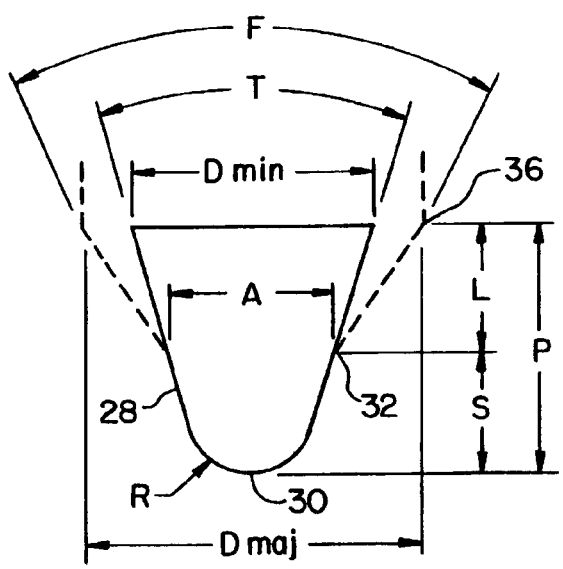
FIG. 2 is a schematic representation illustrating various parameters of a thread-forming screw in accordance with the present invention.
Figure 3:
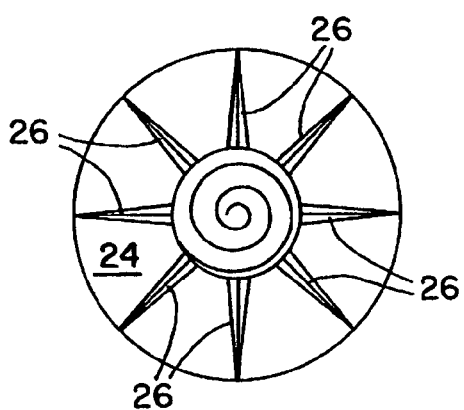
FIG. 3 is an end view of the screw shown in FIG. 1.

With reference now to FIG. 2, various variable features of the present invention will be described in greater detail. For a greater understanding of the physical features and relationships of components in screw 10 according to the present invention, as shown in FIG. 2, the following references and definitions shall apply:

"A"—diameter of tapered end at the location of thread start 32.

"$D_{min}$"—mean minor diameter, specified for the diameter of shaft 14.

"$D_{maj}$"—mean major diameter, specified for the diameter of thread 16.

"$D_{pilot}$"—mean diameter of a specified pilot hole for the screw

"F"—fade angle of thread start 32.

"L"—axial distance from thread start 32 to first full thread 36.

"P"—axial distance from distal tip 30 to first full thread 36.

"R"—radius of distal tip 30.

"S"—axial distance from distal tip 30 to thread start 32.

"T"—taper angle from shaft 16 to tip 30.

In accordance with the present invention, "A", "P", "R" and "S" are controlled to optimize the relationship between insertion torque requirements and stripout resistance for each screw size, and to provide consistent performance among similar screws 10 used in similar applications. The selections of values for "A", "P", "R" and "S", to be described in detail hereafter, are dependent upon the diameter of shaft 14 and the diameter of threads 16. More specifically, the values for "A", "P", "R" and "S" for any screw size are calculated from industry prescribed standards for the mean minor diameter ("$D_{min}$"), the mean major diameter ("$D_{maj}$") and/or the mean pilot hole diameter ("$D_{pilot}$") which itself is calculable from "$D_{min}$" and "$D_{maj}$". As mentioned above, regardless of the values of "$D_{min}$", "$D_{maj}$", or "$D_{pilot}$" "A", "P", "R" and "S", all screws 10, regardless of screw size, in accordance with the present invention have a thread angle 34 of about fifty-eight degrees, and are provided with 18 threads per inch axial length of shaft 14. However, the values of "A", "P", "R" and "S" are selected for different screw sizes to achieve consistency in performance and improved performance over known sheet metal screw designs.

As known to those skilled in the art, industry standards establish specified requirements for screws of different sizes, including tolerances in diameters from the specified screw size, pilot hole sizes for different screw sizes, and the like. The present invention is applicable to screws of different sizes and to different or varying industry standards for such screws. For any given screw size, the mean major diameter ("$D_{maj}$") is the average of the minimum accepted major diameter and the maximum accepted major diameter, each determined as the desired or preferred major diameter, plus or minus the industry accepted tolerance.

For any given screw size, the mean minor diameter ("$D_{min}$") is the average of the maximum accepted minor diameter and the minimum accepted minor diameter, each determined as the desired or preferred minor diameter, plus or minus the industry accepted tolerance.

By way of example of the above, the Industrial Fasteners Institute (I.F.I.) publishes industrial fastener standards that are commonly and well accepted throughout the industry. The "7th Edition, Inch Fastener Standards" published in the 2003 by the I.F.I. includes a "Table 6" on page H-26, which is an Abstract of the American Society of Mechanical Engineers Standard ASME B18.6.4 1998, which states nominal fastener sizes, accepted thread counts per inch, minimum and maximum major diameter dimensions, minimum and maximum minor diameter dimensions and the minimum practical nominal screw lengths. The following can be found in that chart:

| Screw Size | Major Diameter | | Minor Diameter | |
|---|---|---|---|---|
| | Max. | Min. | Max. | Min. |
| #8 | 0.166 | 0.159 | 0.122 | 0.116 |
| #10 | 0.189 | 0.182 | 0.141 | 0.135 |

Accordingly, the mean values of "$D_{maj}$" and "$D_{min}$" as defined herein, can be determined. For a #8 screw "$D_{maj}$" is 0.1625 inch and "$D_{min}$" is 0.119 inch. For a #10 screw "$D_{maj}$" is 0.1855 inch and "$D_{min}$" is 0.138 inch.

Additionally, as known to those skilled in the art, the proper pilot hole diameter 44 for any screw size is dependent upon the specified major diameter defined by thread 16 and the specified minor diameter defined by shaft 14. More specifically, "$D_{pilot}$" is approximately the average of "$D_{maj}$" and "$D_{min}$". Preferably, "$D_{pilot}$" is slightly less than the average, about 98% of the average of "$D_{maj}$" and "$D_{min}$" (See for example, "7th Edition, Inch Fastener Standards" published in the 2003 by the I.F.I. "Table 2" on page H-12). For specified, known screw sizes, specified pilot hole diameters are commonly known and widely published in the industry. For example, the above-identified Table 2 provides the following information:

| Screw Size | Pilot Hole Diameter | | |
|---|---|---|---|
| | Maximum | Mean | Minimum |
| #8 | 0.148 | 0.138 | 0.128 |
| #10 | 0.170 | 0.159 | 0.148 |

It is desirable that all screws 10 in a group of screws 10 start similarly in pilot holes of standard diameter for a screw of a given size. So-called thread pickup should be consistent from one screw 10 to a next screw 10, when both are installed in standard size pilot holes in similar material. This is particularly desirable on assembly lines, where screws are inserted rapidly and repetitively. The relationship between the position of thread start 32 and distal tip 30 should be consistent for all screws 10 of that size to achieve consistent start performance.

With "$D_{maj}$", "$D_{min}$" and "$D_{pilot}$" determined as explained above, the values thereof are used for determining the values for "A", "P", "R" and "S".

In accordance with the present invention, the axial distance "S" from distal tip 30 to thread start 32 on tapered end 28, for screws of all sizes, is between about four-tenths and about one-half of the value of "$D_{min}$" or about 30% to about 45% of "$D_{pilot}$". This common factor is referred to herein as the "thread start factor". Preferably, for screws 10 of all sizes, "S"=0.451×"$D_{min}$" or about 40% of "$D_{pilot}$".

The radius "R" of distal tip 30 is between about two-tenths and about three-tenths of the value for "$D_{min}$" or about 23% to 35% of "$D_{pilot}$" for each screw 10 in accordance with the present invention. This common factor for all screws 10 of the present invention is referred to herein as the "radius factor". Preferably, for screws 10 of all sizes, "R"=0.287×"$D_{min}$" or about 25% of "$D_{pilot}$".

The diameter "A" of tapered end 28 at the location of thread start 32 is between about six-tenths and about seven-tenths of the value of "$D_{min}$" or about 55% to 65% of "$D_{pilot}$", for each screw 10 in accordance with the present invention. This common factor for all screws 10 of the present invention is referred to herein as the "diameter factor". Preferably, for screws 10 of all sizes, "A"=0.680×"$D_{min}$" or about 60% of "$D_{pilot}$".

In accordance with the present invention, for each screw 10, the axial distance "P" from distal tip 30 to the first full thread is between about 1.02 and about 1.08 times the calculated value of "$D_{min}$" or about 88% to 100% of "$D_{pilot}$". This common factor for all screws 10 of the present invention is referred to herein as the "distance factor". Preferably, for screws 10 of all sizes "P"=1.06×"$D_{min}$" or 93% of "$D_{pilot}$".

Taper angle "T" is held at thirty degrees (30°) for all screws 10. A thirty-degree taper angle provides more accurate control of "S" and "A", and thereby the relative position of thread start 32 for improved starting performance of screws 10 in standard and non-standard pilot holes.

Fade angle "F" occurs as a consequence of the calculated and controlled values of "R", "A", "S", "T" and "L".

Using the above calculations, examples of values for screws 10 of different sizes, in accordance with the present invention, are as follows:

| Size | "$D_{min}$" | "$D_{maj}$" | "F°" | "R" | "L" | "P" | "S" | "A" |
|---|---|---|---|---|---|---|---|---|
| #8 | .119 | .1625 | 60.51 | .035 | .073 | .128 | .055 | .083 |
| #10 | .138 | .1855 | 59.09 | .040 | .084 | .148 | .064 | .096 |

Tests were performed comparing screws of the present design with a sheet metal screw having torque absorbing ribs, available from ITW Shakeproof Industrial Products; Broadview, Ill. A #6 screw of the present design and the prior design for a #6 sheet metal screw having the standard 20 threads per inch were tested. Each was fastened through a 0.025" thick bearing sheet having a 0.156" diameter clearance hole, and a 0.025" thick tapping sheet having a 0.105" diameter tapping hole. Stripping torque for the #6-20 prior screw was 17.23 lb-in. and for the screw of the present design was 21.88 lb-in. The screw of the present invention exhibited an improvement of twenty-seven percent over the prior screw.

Similar tests were performed comparing #8 size screws of the present design with a #8 sheet metal screw of the prior design having the standard 18 threads per inch of shaft length. Each was fastened through a 0.030" thick bearing sheet having a 0.196" diameter clearance hole, and a 0.030" thick tapping sheet having a 0.125" diameter tapping hole. Stripping torque for the #8-18 prior screw was 42.10 lb-in and for the screw of the present design was 43.24 lb-in. The screw of the present invention exhibited an improvement of three percent over the prior screw.

Tests also were performed comparing #10 screws of the present design with a #10 sheet metal screws of the prior design having 16 threads per inch of shaft length. Each was fastened through a 0.030" thick bearing sheet having a 0.220" diameter clearance hole, and a 0.030" thick tapping sheet having a 0.144" diameter tapping hole. Stripping torque for the #10-16 prior screw was 41.00 lb-in and for the screw of the present design was 48.39 lb-in. The screw of the present invention exhibited an improvement of eighteen percent over the prior screw.

The rounded distal tip 30, axial lengths from the tip to thread start 32 and to first full thread 36, as well as the diameters of the tapered end at various locations provide ease in centering and starting screws 10 in standard and nonstandard pilot holes. Further, the rounded distal tip 30 is blunt, reducing the potential for damage to things or injury to people coming in contact therewith. The standard thread pitch at 18 threads per inch provides equal or improved performance versus standard screws of different sizes provided with the standard thread pitches. Manufacturing is simplified. Since the screw can be used in both thicker and thinner materials, acquisition, storing and distributing the proper screw in manufacturing and assembly plants are simplified.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method for making a thread-forming tapping screw having a head, a shaft extending from the head and a helical thread on the shaft, said method comprising steps of:

determining a screw size and a mean minor diameter for the screw as the average of minimum and maximum acceptable shaft diameters for the screw size;

forming the screw head, the shaft extending from the head and a tapered end on the shaft having a distal tip, the distal tip being created with a rounded shape;

forming the helical thread on the shaft including a thread start on the tapered end and a first full thread following the thread start; and said forming steps including at least one of:

creating the thread start at a position on the tapered end an axial distance from the distal tip related to the mean minor diameter by a thread start factor of between about 0.4 and about 0.5;

creating the first full thread on the shaft an axial distance from the distal tip related to the mean minor diameter by a distance factor of between about 1.02 and about 1.08;

creating the tapered end with a diameter at the thread start related to the mean minor diameter by a diameter factor of between about 0.6 and about 0.7; and creating the distal tip with a rounded shape formed on a radius related to the mean minor diameter by a radius factor of between about 0.2 and about 0.3.

2. A method for making a thread-forming tapping screw having a head, a shaft extending from the head and a helical thread on the shaft, said method comprising steps of:

determining a screw size and a mean minor diameter for the screw as the average of minimum and maximum acceptable shaft diameters for the screw size;

forming the screw head, the shaft extending from the head and a tapered end on the shaft having a distal tip;

forming the helical thread on the shaft including a thread start on the tapered end and a first full thread following the thread start; and said forming steps including at least two of:

creating the thread start at a position on the tapered end an axial distance from the distal tip related to the mean minor diameter by a thread start factor of between about 0.4 and about 0.5;

creating the first full thread on the shaft an axial distance from the distal tip related to the mean minor diameter by a distance factor of between about 1.02 and about 1.08;

creating the tapered end with a diameter at the thread start related to the mean minor diameter by a diameter factor of between about 0.6 and about 0.7; and creating the distal tip with a rounded shape formed on a radius related to the mean minor diameter by a radius factor of between about 0.2 and about 0.3.

3. The method of claim 2 including at least three of said steps of creating.

4. The method of claim 2 including all of said steps of creating.

* * * * *